United States Patent
Pike

(10) Patent No.: US 9,585,306 B1
(45) Date of Patent: Mar. 7, 2017

(54) DUAL CHAIN FERTILIZER SPREADER FOR GOLF COURSES

(71) Applicant: Shane Pike, Greensboro, NC (US)

(72) Inventor: Shane Pike, Greensboro, NC (US)

(*) Notice: Subject to any disclaimer, the term of this patent is extended or adjusted under 35 U.S.C. 154(b) by 822 days.

(21) Appl. No.: 13/740,659

(22) Filed: Jan. 14, 2013

Related U.S. Application Data

(60) Provisional application No. 61/586,508, filed on Jan. 13, 2012.

(51) Int. Cl.
   *A01C 15/00* (2006.01)
   *A01C 17/00* (2006.01)

(52) U.S. Cl.
   CPC .................................. *A01C 17/008* (2013.01)

(58) Field of Classification Search
   CPC ..................................................... A01C 17/008
   USPC ....... 239/661, 665, 667, 673, 656, 658, 664,
                239/668, 671, 672, 674, 676, 677, 679,
                                               239/681, 682, 687
   See application file for complete search history.

(56) References Cited

U.S. PATENT DOCUMENTS

| | | | |
|---|---|---|---|
| 4,405,089 A * | 9/1983 | Taylor ....................... | B60P 1/38 239/656 |
| 6,012,656 A * | 1/2000 | Anderson ................ | A01C 3/06 198/735.3 |
| 6,145,455 A | 11/2000 | Gust et al. ..................... | 111/178 |
| 6,202,944 B1 | 3/2001 | McCrory ....................... | 239/658 |
| 6,220,531 B1 | 4/2001 | Pierce et al. .................. | 239/672 |
| 6,446,879 B1 * | 9/2002 | Kime .................... | E01C 19/203 239/170 |
| 6,932,286 B2 | 8/2005 | Smith et al. ................... | 239/650 |
| 7,142,966 B2 | 11/2006 | Saller et al. .................... | 701/50 |
| 7,380,733 B2 | 6/2008 | Owenby et al. .............. | 239/656 |
| 2003/0155453 A1 * | 8/2003 | Kinkead ............. | A01C 17/001 239/673 |
| 2012/0067985 A1 * | 3/2012 | Smith ................... | E01C 19/203 239/672 |

OTHER PUBLICATIONS

TeeJet Technologies, page from a manual; undated, admitted prior art.

* cited by examiner

*Primary Examiner* — Jason Boeckmann
(74) *Attorney, Agent, or Firm* — MacCord Mason PLLC

(57) ABSTRACT

A method of spreading granular fertilizer includes driving a small framed truck over an electronically mapped area that is in need of granular fertilizer. As the small framed truck is driven over the mapped area, a GPS sensor is read to determine the location of the small framed truck on the mapped area. An electronic control determines the application rate of granular fertilizer needed to the left of the truck and the application rate of granular fertilizer needed to the right of the truck in relation to the location of the truck on the mapped area. The method includes dispensing left and right amounts of granular fertilizer from a hopper carried on the truck, with the left and right amounts being separately dispensed at rates determined in the determining step. Apparatus to carry out the method is also disclosed.

12 Claims, 7 Drawing Sheets

DUAL CHAIN FERTILIZER SPREADER FOR GOLF COURSES

This application claims the benefit of the filing date of U.S. Provisional application 61/586,508 filed Jan. 13, 2012.

BACKGROUND OF THE INVENTION

The present invention relates to improved spreaders for fertilizer for the fairways of golf courses. Golf course fairways are usually planted in grass, which require considerable attention and care to maintain its vigorous growing condition. One of the main forms for care is the application of fertilizer to maintain a growing habit and attractive green color. Golf course fairways are the distinct growing area, often bounded by golf course roughs and having within them the putting greens which receive even more care than the fairways. The attention directed towards the green is not the same as that for the more expansive areas known as the fairways. Although as a general matter, fairways are desirably fertilized, the application of the fertilizer is preferably not uniform. In particular, environmental regulations indicate that excessive fertilizations are to be avoided to avoid run off to streams, so there are constraints on how much fertilizer should be applied. In addition, excess applications to areas where fertilizer is not desired leads to a waste of the expense of the fertilizer.

The fertilizer application industry for the past decade or so has used GPS guidance to correlate where to apply fertilizer in a growing field, particularly for agricultural applications, and the technology for determining the location of a spreader by GPS is reasonably well developed in order to allow the spreader to know with usable precision where it is in an agricultural field. Indeed, it is known to use GPS positioning to accurately turn on and off the individual applicators of a liquid application fertilizer on golf courses. In those instances, nozzles on booms extended from the sides of a moving vehicle are each individually controlled to turn on and off as required for the location over which they are located.

However, it is not known to have accurate application of granular fertilizer on golf courses in accordance with GPS readings.

SUMMARY

The invention satisfied one or more needs in the art by providing a fertilizer spreader attachment for a small framed truck that has a chassis, engine, drive train and wheels. The fertilizer spreader attachment includes a frame that has a front and a rear and that is configured to mount on the chassis. A hopper mounted to the frame has an elongated bottom and a rear opening. Left and right driven chains are mounted to the frame, each with an upper run over the elongated bottom and exiting the rear opening in the hopper. The left and right driven chains are independently driven to transport the upper run of each chain rearwardly, and a divider is positioned between the left and right driven chains. Left and right driven spinners are mounted to the frame at the rear below rear ends of the left and right driven chains, respectively.

A control system includes a GPS reader coupled to a computer memory and processor to compare where the fertilizer spreader attachment is as mounted on a truck with a stored electronic map of where granular fertilizer is needed. As the truck travels over the golf course fairway or other area to be fertilized, the control system outputs control signals to control the speeds of the left and right driven spinners and the left and right driven chains, so that the control signals drive the left chain and spinner independently of the right chain and spinner. The fertilizer spreader attachment can be mounted on a small framed truck, and as the truck traverses an area, fertilizer held in the hopper can descend by gravity onto the left and right driven chains and be transported on the chains rearwardly to fall off the left and right driven chains onto the left and right driven spinners, respectively, and be broadcast to the left and right of the fertilizer spreader attachment in separately controllable amounts. The spinners throw the fertilizer out using centrifugal forces.

The invention has particular utility in combination with a small framed truck that has a chassis, engine, drive train and wheels. The control system is preferably calibrated to be able to determine the location of the truck at defined points on a golf course fairway, down to twelve inches pass-to-pass accuracy. Typically, the left and right driven chains are endless chains, each with a lower run that moves forwardly under the hopper when the upper run of each chain moves rearwardly.

Desirably, the rear opening in the hopper has a size that can be varied. One way that the opening size can be varied is by controlling a variable position gate above the chains.

A rear frame bumper may be included extending rearwardly behind the spinners and angled forwardly right and left outward of the spinners. If so, the bumper may be further equipped with a downwardly extending shield that is supported by the rear frame bumper.

Preferably, the fertilizer spreader attachment has removable mounts on the frame to enable it to be selectively mounted to and removed from a chassis of a small framed truck. The removable mounts may include a pivot mount and a piston and cylinder forward of the pivot mount, so that the piston can be extended in the cylinder to raise a front end of the hopper, and the entire fertilizer spreader attachment can be selectively mounted to and removed from the small framed truck.

The invention can also be considered as a method of spreading granular fertilizer. The method includes driving a small framed truck over an electronically mapped area that is in need of granular fertilizer. As the small framed truck is driven over the mapped area, a GPS sensor reading of the location of the small framed truck on the mapped area is used to determine in an electronic control the application rate of granular fertilizer needed to the left of the truck and the application rate of granular fertilizer needed to the right of the truck in relation to the location of the truck on the mapped area. The information is used to modulate the dispensing of left and right amounts of granular fertilizer from a hopper carried on the truck, with the left and right amounts being separately dispensed at rates determined in the determining step.

Dispensing may occur from a location on the truck remote from the GPS sensor, and the determining step may take into account the relative position of the GPS sensor and where dispensing occurs in determining the application rates.

Dispensing the left amount of granular fertilizer may include transporting granular fertilizer on a rearwardly moving chain from a hopper onto a spinner and centrifugally throwing granular fertilizer leftward from the spinner. Dispensing the right amount of granular fertilizer may include transporting granular fertilizer on a second rearwardly moving chain from a hopper onto a second spinner and centrifugally throwing granular fertilizer rightward from the second spinner.

Dispensing may include dividing granular fertilizer being transported rearwardly on the chains with a divider positioned between the chains. Dispensing may also include controlling the size of an opening in the hopper through which the rearwardly moving chain moves.

Reading a GPS sensor of the location of the small framed truck on the mapped area is preferably done with at least twelve inches pass-to-pass accuracy. The method can include shielding areas to one side of the truck from fertilizer dispensed from the other side.

The method can include selectively mounting the hopper to a chassis of a small framed truck, and subsequently removing the hopper from the small framed truck. It can also include tilting the hopper rearward about a pivot mount to the truck by extending a piston in a cylinder to raise a front end of the hopper.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
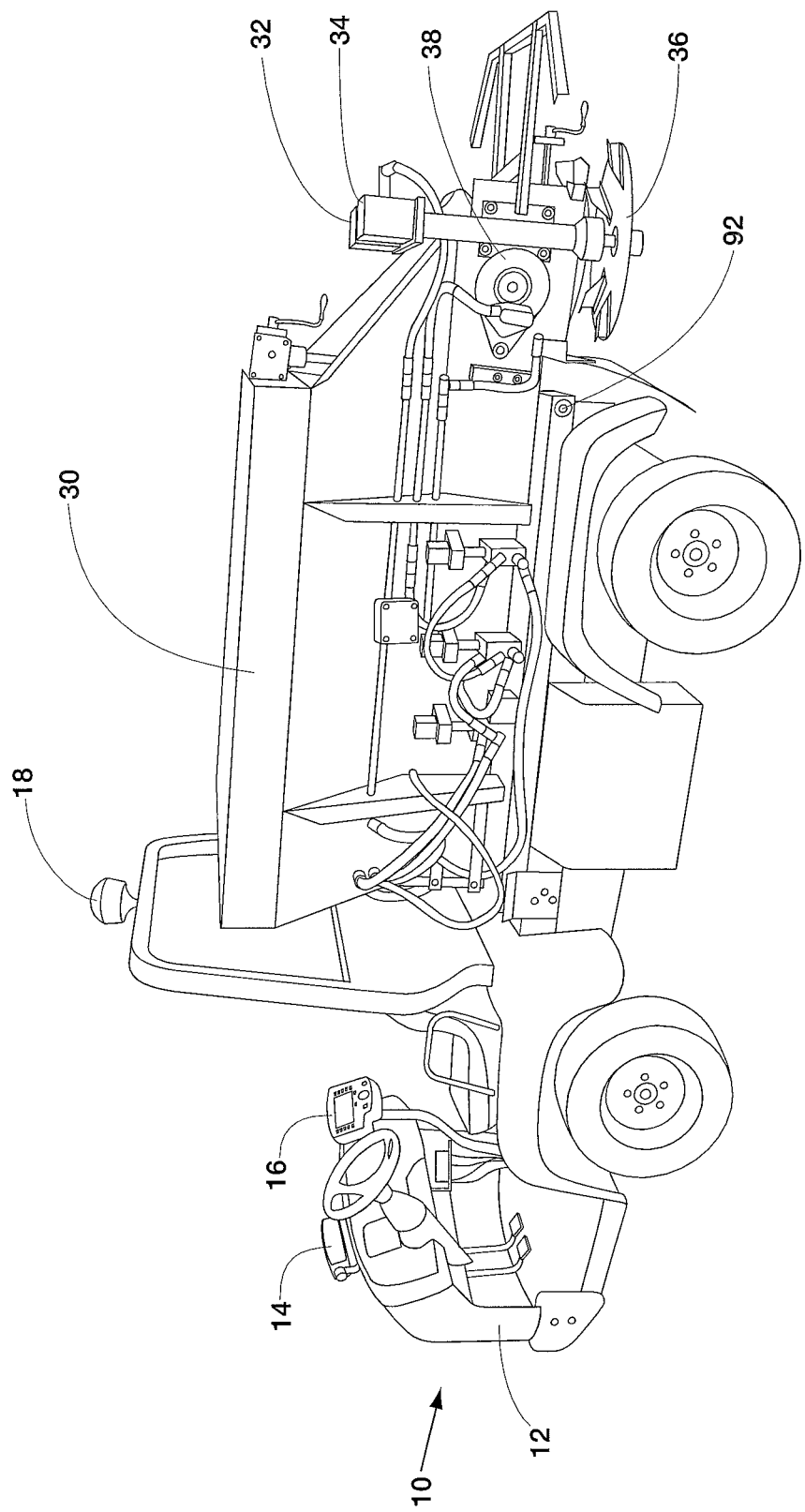
FIG. 1 is a side view of an embodiment of a dual chain fertilizer spreader for golf courses in accordance with the invention.

As seen in FIG. 1, a vehicle 10 is made up of with a chassis 12 equipped with a removable hopper 30. The chassis 12 is preferably a conventional, small framed truck such as a Toro Workman or a John Deere Gator with its conventional engine, drive train and wheels. These are available from their respective vendors. The remaining components can be added to the chassis to yield the desired functional apparatus. Preferably, the components are installed in a removable fashion, so that the fertilizer spreader and hopper components can be removed to allow the chassis to be used for other functions, when the spreading of fertilizer is not needed.

The chassis 12 is equipped with conventional GPS equipment such as Teejet equipment (available from Spraying Systems Company, Wheaton, Ill.) or equivalent. The GPS equipment includes the data input and monitoring component 16, a light bar 14, and an antenna 18, computer processor and computer memory (not shown separately) as well as associated cabling to allow their control output signals to be applied to the various operative components described hereinafter. Those operative components are generally hydraulic motors driven by a hydraulic pressure supply, not shown. The signals can control valve openings, for instance. The GP S equipment is calibrated to be able to determine the location of the vehicle at defined points on a golf course fairway, preferably down to twelve inches pass-to-pass accuracy. The location of the vehicle is compared with a stored electronic map of the golf course fairway or other area to be fertilized. If the data reference is the antenna 18, then computation transformations are undertaken in the electronics to correlate that antenna location with the location of the spinners 36 and 36' (see FIG. 4) at the rear of the vehicle. That is, the fertilizer is going to be dispensed from the spinners, and in order to precisely place the spinner locations with respect to the antenna 18, a computational transformation is made to correct for the displacement in the distance from the antenna 18 to the spinners themselves, in well-known algorithmic fashion.

The hopper 30 is shown having two hydraulic motors 32 and 34, each driving a vertical shaft having a spinner 36 or 36' at the bottom of the shaft. Also shown in FIG. 1 is a hydraulic motor 38 which drives a chain on one side of the hopper 30, to be discussed in more detail hereafter.

Figure 2:
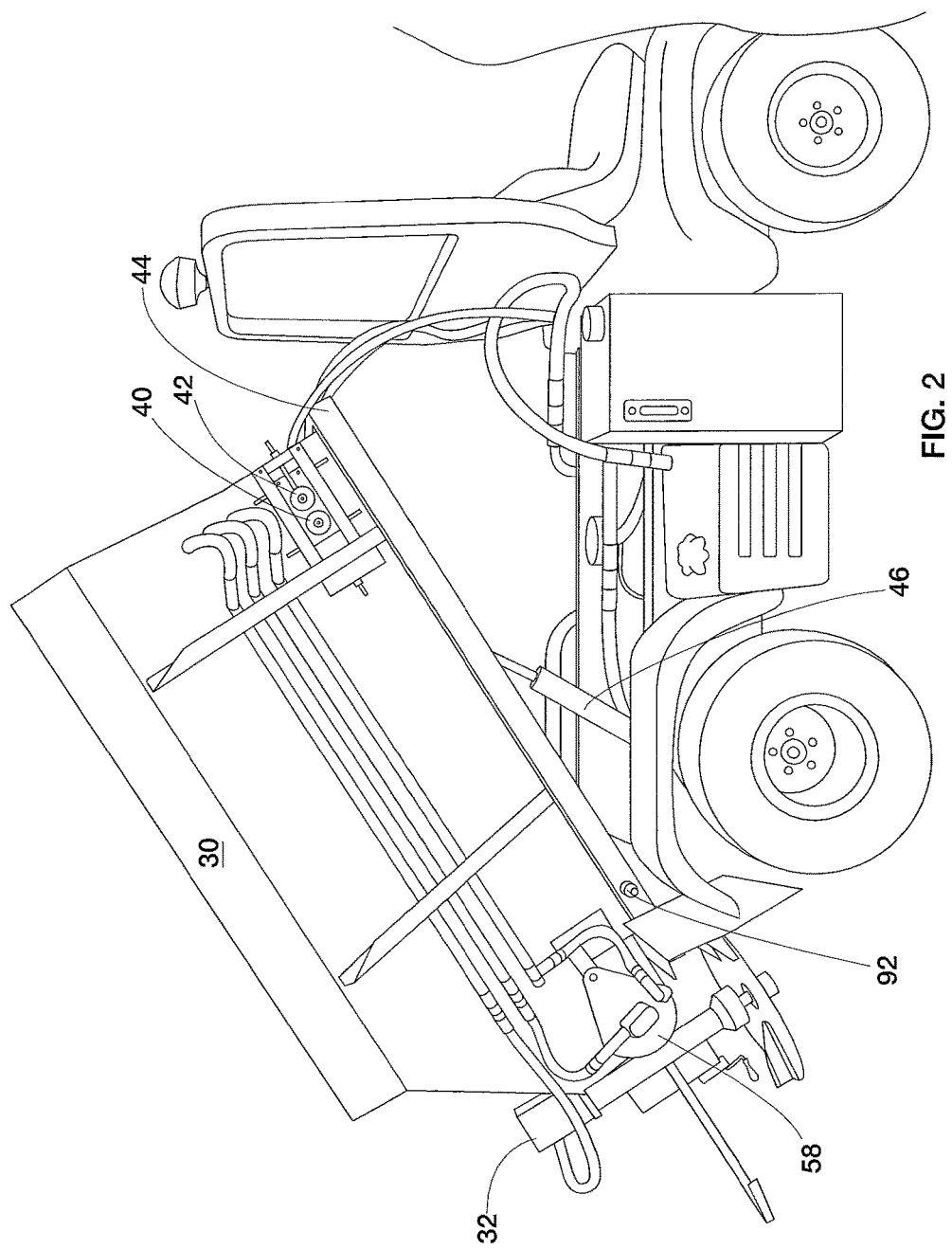
FIG. 2 is a side view of the embodiment of FIG. 1, with the hopper raised.

In FIG. 2, the hopper is shown elevated. The hopper is mounted on a frame 44 which is connected at hinge pin 92 to be pivotally connected to the chassis. Also included is a hydraulic cylinder and piston 46 which is pivotally mounted on one end to the chassis and to the other end to the frame 44. Thus, extension of the piston 46 from the hydraulic cylinder causes the tilting rearward of hopper 30. This can be advantageous when it is desired to wash out the hopper and drain contents thereof. FIG. 2 shows the vehicle from the opposite side of FIG. 1, and therefore shows a second hydraulic motor 58 and also shows the bearings 40 and 42. Bearings on the other side of the hopper align with them. The bearings 40 and 42 are mounted so that they can be moved fore and aft to adjust the tension on a chain extending between the spindles on the respective bearings 40 and 42 and complementary spindles affixed to the drive motors 38 and 58 at the rear of the hopper.

Figure 3:
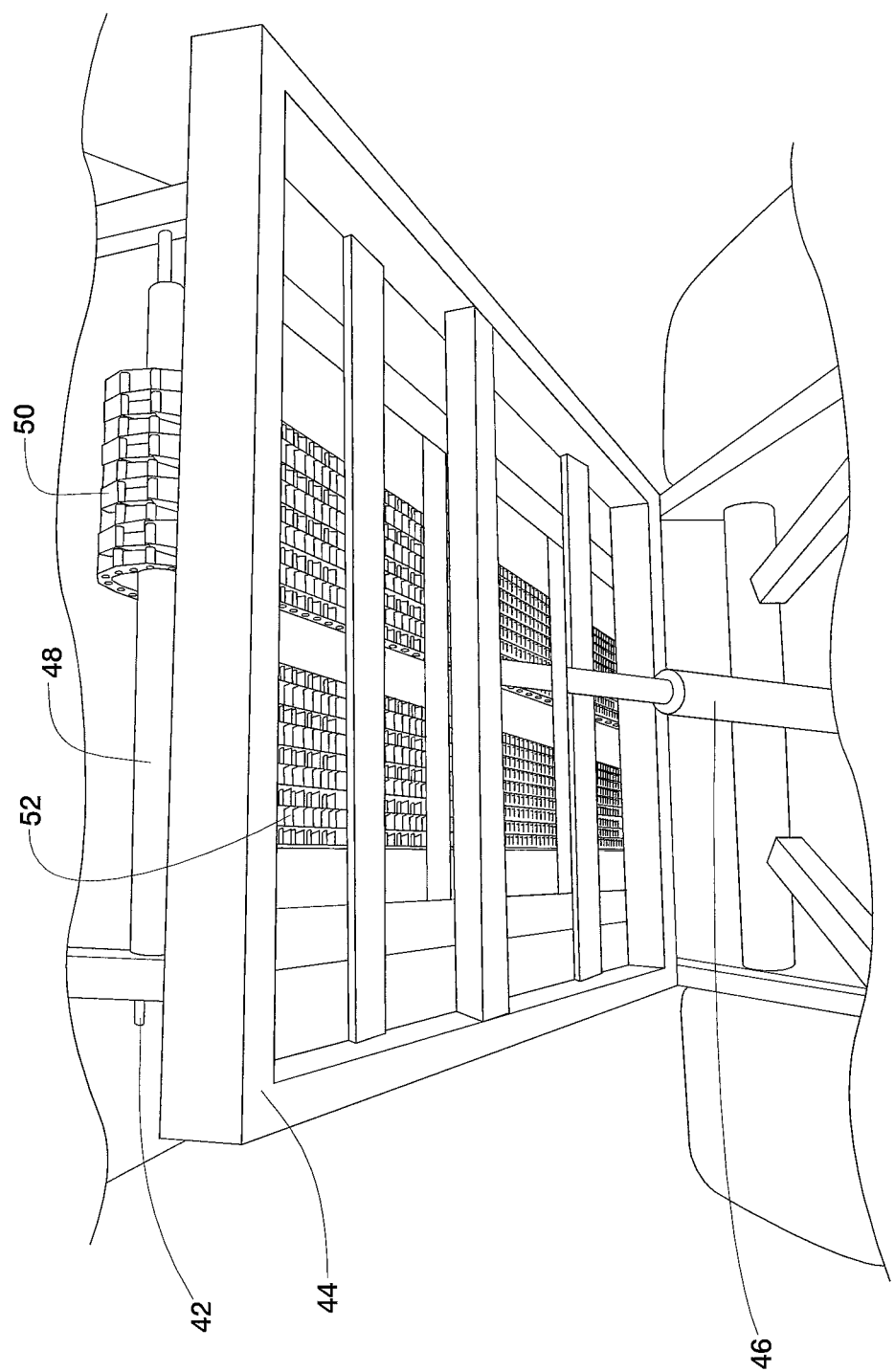
FIG. 3 is a view of the underside of the hopper.

Looking now at FIG. 3, one sees the spindle 48, which is journalled in the bearing 42, and its associated chain 50. Chain 52 which is journalled on a spindle in bearing 40 is also shown, although that spindle is not visible in this view. The hydraulic motors 58 and 38 drive their respective chain 50 and 52 independently and therefore can drive them at different speeds, allowing the fertilizer within the hopper 30 which falls on each chain to be transported rearwardly, resulting in different speeds on the right and left sides of the hopper.

Figure 4:
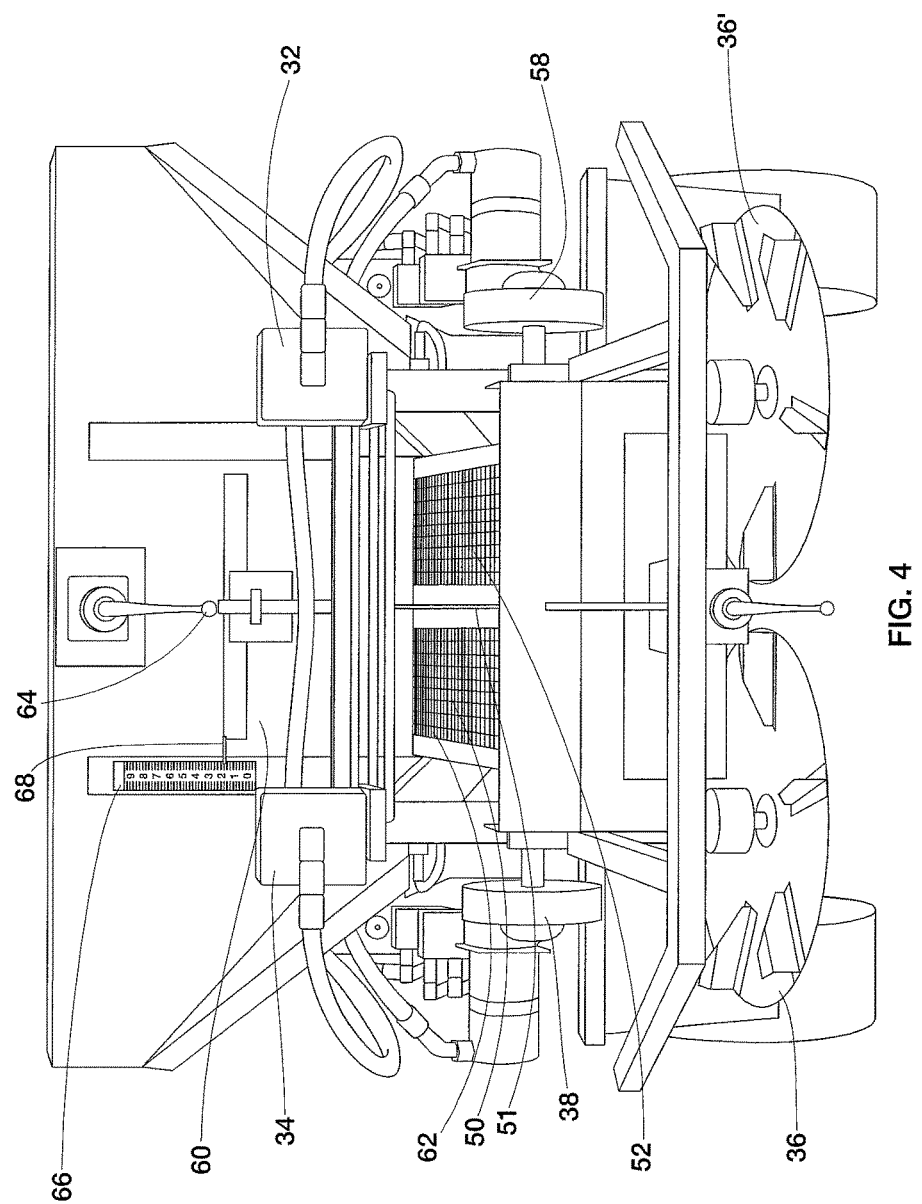
FIG. 4 is a rear view of the embodiment of FIG. 1.

FIG. 4 shows the rear of the hopper 30 and the chains 52 and 50 coming out of the rear of the hopper where they are engaged on spindles in respective hydraulic motors 38 and 58. The two motors 38 and 58 drive sprockets (not shown) which engage with the chains to cause the motion of the top runs of the chains rearwardly from the back of the hopper. The view of the top runs of the chains seen in FIG. 4 is a rearward motion, whereas the view of the bottom run of the chains seen in FIG. 3 is forward as the endless chains return to pivot around their respective spindles. As used herein, the term "chain" means a type of mesh that forms pockets into which aliquots of granular fertilizer can fall and be transported by the chain. It also includes belts of various configurations that are also known for conveying granular fertilizer.

Figure 5:
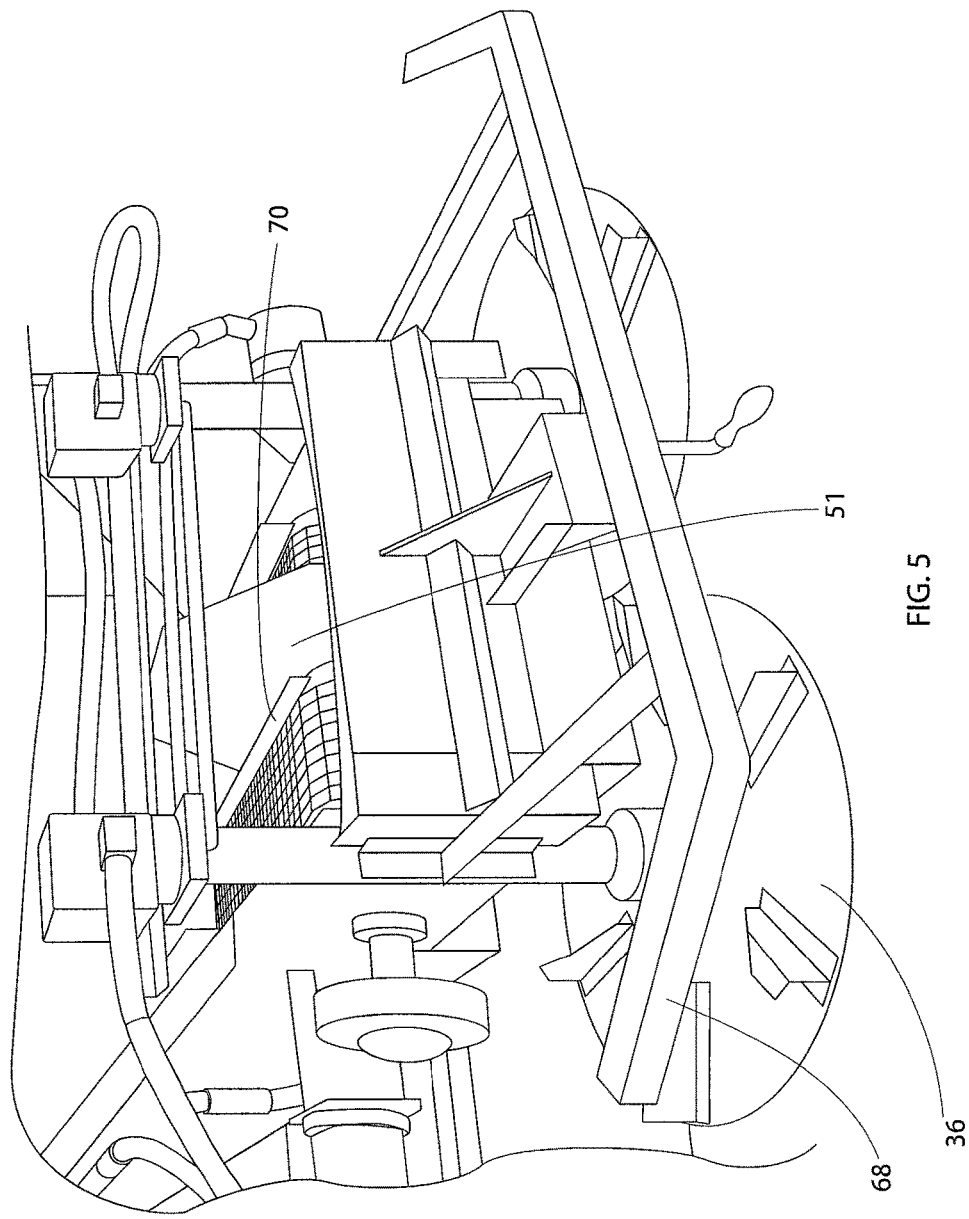
FIG. 5 is a rear perspective view of the embodiment of FIG. 1.
Figure 6:
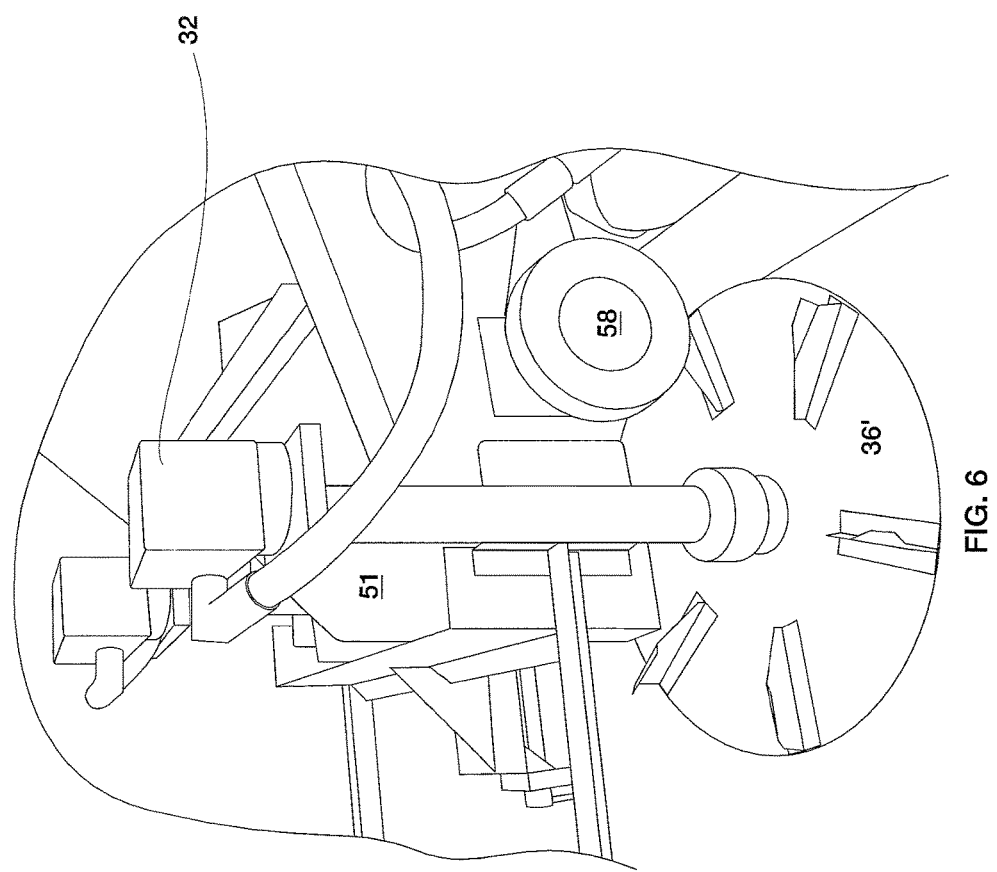
FIG. 6 is an enlarged side view of the spreader wheel of the embodiment.

FIG. 4 also shows a vertical divider 51 extending rearwardly between the chains as a continuation of a shorter divider 70 seen in FIG. 5 to help to maintain independence of the flow rates of the left and right bodies of fertilizer being discharged. As the fertilizer reaches the end of its respective chain, it falls onto a respective one of the spinners 36, 36'. Each of the spinners is independently driven by its own hydraulic motor, as discussed above. Thus, the right side and the left side have independent operation of the chain speed as well as spinner speed, and together the independently controlled speeds can affect the rate at which the fertilizer is discharged and distributed by the spinners. These can, in turn, be controlled by the GPS system, so that the chain and/or the spinner are speeded up or slowed down depending upon how much fertilizer is to be dispensed at a given location on a golf course fairway. Thus, the spreader can provide a variable rate application.

The left spinner tends to throw fertilizer to the left and the right tends to throw it to the right. If the vehicle traverses along the edge of the fairway with the fairway on the left and the rough on the right, and the device can fertilize only with the left spinner, avoiding the wastage of the fertilizer on the rough that may not need it.

The rate of flow of the fertilizer out of the hopper under the motion of the chain is also controlled by the variable positioning of a gate 60. This gate changes the size of an opening 62 above the chains and the volume of fertilizer moved by the moving chains. The gate 60 is connected to a rack and pinion apparatus 64 which can allow the gate to be raised or lowered in conventional fashion. The height of the gate can be determined and calibrated using a scale 66 and a pointer 68.

FIG. 5 shows a rear frame component or bumper 68 extending rearwardly from behind the spinners and angled forwardly right and left outward of the spinners. This frame 68 can be provided with a downwardly extended sheet of foldable plastic or the like to provide a shield to shield an area that is adjacent to the vehicle motion, if desired. In particular, if, for example the vehicle is servicing a fairway adjacent to a green, the fertilizer intended for the fairway should not be allowed to be applied to the green, and the shield can be put in place on the side of the bumper towards the green, as a blocking element hanging down from the frame 68 to prevent fertilizer granules from traveling to the green.

FIG. 5 also usefully shows the downward extent of the chains where they rotate about the spindles in the hydraulic motors 58 and 38.

Figure 7:
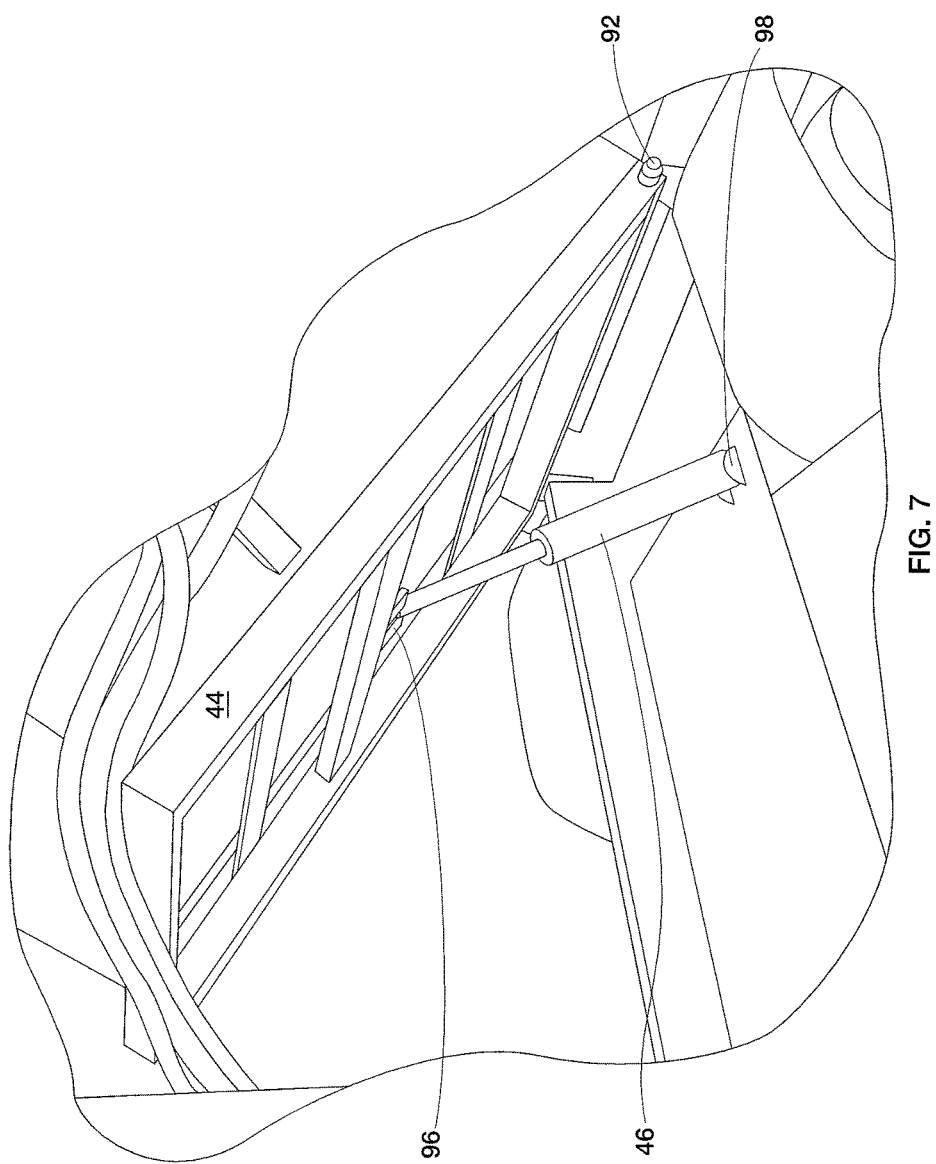
FIG. 7 is a side view of the embodiment of FIG. 1, with the hopper raised, showing the lifting mechanism.

FIG. 7 shows more detail of the lifting mechanism of the hydraulic piston and cylinder arrangement 46. This shows that the piston cylinder 46 is pivotally mounted at 98 to the chassis and to the frame 44 at 96. As a result of the extension of the piston within the cylinder by the application of hydraulic fluid to the cylinder, the frame pivots about pivot point 92. The pivot points 92 and at least one of the pivots 96 and 98 are removable, to remove the hopper from the chassis.

The various illustrations show also the associated hydraulic hoses from a hydraulic fluid pressure pump and reservoir, which is conventional, therefore not discussed in detail. In order, of course for the hopper to be removable, the hydraulic hose fittings are preferably of the type that can be removed without undue effort.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A fertilizer spreader attachment for a small framed truck that has a chassis, engine, drive train and wheels, the fertilizer spreader attachment comprising
    a frame having a front and a rear configured to mount on the chassis, a hopper mounted to the frame having an elongated bottom and a rear opening, left and right independently driven chains mounted to the frame, each with an upper run over the elongated bottom and exiting the rear opening in the hopper, the left and right driven chains being driven to transport the upper run of each chain rearwardly, and a divider between the left and right driven chains,
    left and right driven spinners mounted to the frame at the rear below rear ends of the left and right driven chains, respectively, and
    a control system comprising a GPS reader coupled to a computer memory and processor to compare where the fertilizer spreader attachment is as mounted on a truck with a stored electronic map of where granular fertilizer is needed and to output control signals to control the speeds of the left and right driven spinners and the left and right driven chains, the control signals driving the left chain and spinner independently of the right chain and spinner,
    so that the fertilizer spreader attachment can be mounted on a small framed truck, and as the truck traverses an area, fertilizer held in the hopper can descend by gravity onto the left and right driven chains, be transported on the chains rearwardly to fall off the left and right driven chains onto the left and right driven spinners, respectively, and be broadcast to the left and right of the fertilizer spreader attachment in separately controllable amounts.

2. A fertilizer spreader attachment as claimed in claim 1 in further combination with a small framed truck that has a chassis, engine, drive train and wheels.

3. A fertilizer spreader attachment as claimed in claim 1 wherein the control system is calibrated to be able to determine the location of the truck at defined points on a golf course fairway, down to twelve inches pass-to-pass accuracy.

4. A fertilizer spreader attachment as claimed in claim 1 wherein the left and right driven chains are endless chains, each with a lower run that moves forwardly under the hopper when the upper run of each chain moves rearwardly.

5. A fertilizer spreader attachment as claimed in claim 1 wherein the rear opening in the hopper has a size that can be varied.

6. A fertilizer spreader attachment as claimed in claim 5 the opening size can be varied by controlling a variable position gate above the chains.

7. A fertilizer spreader attachment as claimed in claim 1 further comprising a rear frame bumper extending rearwardly behind the spinners and angled forwardly right and left outward of the spinners.

8. A fertilizer spreader attachment as claimed in claim 7 further comprising a downwardly extending shield supported by the rear frame bumper.

9. A fertilizer spreader attachment as claimed in claim 1 further comprising removable mounts of the frame to a chassis of a small framed truck, the removable mounts including a pivot mount and a piston and cylinder forward of the pivot mount, so that the piston can be extended in the cylinder to raise a front end of the hopper, and the entire fertilizer spreader attachment can be selectively mounted to and removed from the small framed truck.

10. A fertilizer spreader attachment for a small framed truck that has a chassis, engine, drive train and wheels, the fertilizer spreader attachment comprising
    a frame having a front and a rear configured to mount on the chassis, a hopper mounted to the frame having an elongated bottom and a rear opening, left and right independently driven endless chains mounted to the frame with an upper run over the elongated bottom and exiting the rear opening in the hopper, the left and right driven chains being driven to transport the upper run of each chain rearwardly and the lower run forwardly, and a divider between the left and right driven chains, wherein the rear opening in the hopper has a size that can be varied by controlling a variable position gate, left and right driven spinners mounted to the frame at the rear below rear ends of the left and right driven chains, respectively, a rear frame bumper extending rearwardly behind the spinners and angled forwardly right and left outward of the spinners, and a control system comprising a GPS reader to determine where the fertilizer spreader attachment is, a computer memory and processor to compare where the fertilizer spreader attachment is with a stored electronic map of where granular fertilizer is needed and to output control signals to control the speeds of the left and right driven spinners and the left and right driven chains, the control signals driving the left chain and spinner independently of the right chain and spinner, wherein the control system is calibrated to be able to determine the location of the truck at defined points on a golf course fairway, down to twelve inches pass-to-pass accuracy, so that the fertilizer spreader attachment can be mounted on a small framed truck, and as the truck traverses an area, fertilizer held in the hopper can descend by gravity onto the left and right driven chains, be transported on the chains rearwardly to fall off the left and right driven chains onto the left and right driven spinners, respectively, and be broadcast to the left and right of the fertilizer spreader attachment in separately controllable amounts.

11. A fertilizer spreader attachment as claimed in claim 1 wherein the left and right chains are journaled on spindles that are not collinear.

12. A fertilizer spreader attachment as claimed in claim 1 wherein the left and right chains are each a mesh that forms pockets into which aliquots of granular fertilizer can fall and be transported by the chain.

\* \* \* \* \*